(12) United States Patent
Kamstrup

(10) Patent No.: US 11,831,697 B2
(45) Date of Patent: Nov. 28, 2023

(54) SYSTEM FOR AUDIO COMMUNICATION USING LTE

(71) Applicant: GN Audio A/S, Ballerup (DK)

(72) Inventor: Lisa Rørbæk Kamstrup, Ballerup (DK)

(73) Assignee: GN AUDIO A/S, Ballerup (DK)

( * ) Notice: Subject to any disclaimer, the term of this patent is extended or adjusted under 35 U.S.C. 154(b) by 200 days.

(21) Appl. No.: 17/200,639

(22) Filed: Mar. 12, 2021

(65) Prior Publication Data

US 2021/0218785 A1    Jul. 15, 2021

Related U.S. Application Data

(63) Continuation of application No. 15/646,426, filed on Jul. 11, 2017, now abandoned.

(30) Foreign Application Priority Data

Jul. 25, 2016 (EP) .................................... 16180940

(51) Int. Cl.
*H04L 29/06* (2006.01)
*H04M 1/60* (2006.01)
(Continued)

(52) U.S. Cl.
CPC .......... *H04L 65/61* (2022.05); *H04L 65/1059* (2013.01); *H04L 65/1069* (2013.01);
(Continued)

(58) Field of Classification Search
CPC .............. H04R 1/1041; H04R 2420/01; H04R 2420/07; H04L 65/40; H04L 65/1059;
(Continued)

(56) References Cited

U.S. PATENT DOCUMENTS 8,095,120 B1    1/2012    Blair et al.
8,406,415 B1    3/2013    Lambert
(Continued)

FOREIGN PATENT DOCUMENTS

EP    2485465 A2    8/2012
WO    2005013596 A1    2/2005
(Continued)

OTHER PUBLICATIONS

Office Action issued in European Patent Application No. 16180940.5, dated Oct. 30, 2018.
(Continued)

*Primary Examiner* — Maharishi V Khirodhar
*Assistant Examiner* — Kenneth P Hunt
(74) *Attorney, Agent, or Firm* — HAMRE, SCHUMANN, MUELLER & LARSON, P.C.

(57) ABSTRACT

Disclosed are a method, a first electronic audio device, and a system comprising at least a first electronic audio device and a second electronic audio device for performing audio communication between at least the first electronic audio device and the second electronic audio device. The electronic audio devices are configured for wireless communication via a wireless connection. The electronic audio devices are configured to transmit and/or receive audio directly between them via the wireless connection. The electronic audio devices comprise a speaker and a microphone. At least the first electronic audio device is configured to operate and/or communicate in at least three modes for controlling audio to be transmitted from the first electronic audio device to the speaker of the second electronic audio device: a first mode where the transmitted audio is, such as solely, an output from the speaker in the first electronic audio device; a second mode where the transmitted audio is, such as solely, an input from the microphone in the first
(Continued)

electronic audio device; a third mode where the transmitted audio is, such as both, an output from the speaker of the first electronic audio device and an input from the microphone of the first electronic audio device.

12 Claims, 5 Drawing Sheets

(51) Int. Cl.
| | |
|---|---|
| *H04M 1/72412* | (2021.01) |
| *H04R 1/10* | (2006.01) |
| *H04W 4/80* | (2018.01) |
| *H04W 76/10* | (2018.01) |
| *H04L 65/61* | (2022.01) |
| *H04L 65/1069* | (2022.01) |
| *H04L 65/40* | (2022.01) |
| *H04L 65/1059* | (2022.01) |
| *H04L 65/75* | (2022.01) |
| *H04W 4/70* | (2018.01) |
| *H04L 67/10* | (2022.01) |
| *H04W 84/04* | (2009.01) |

(52) U.S. Cl.
CPC ............ *H04L 65/40* (2013.01); *H04L 65/764* (2022.05); *H04M 1/6066* (2013.01); *H04M 1/72412* (2021.01); *H04R 1/1041* (2013.01); *H04W 4/80* (2018.02); *H04W 76/10* (2018.02); *H04L 67/10* (2013.01); *H04M 2250/02* (2013.01); *H04R 2420/01* (2013.01); *H04R 2420/07* (2013.01); *H04W 4/70* (2018.02); *H04W 84/042* (2013.01)

(58) Field of Classification Search
CPC ..... H04L 65/764; H04L 65/61; H04L 65/762; H04L 65/1069; H04L 67/10; H04W 4/80; H04W 76/10; H04W 4/70; H04W 84/042; H04M 1/72412; H04M 1/6066; H04M 2250/02

See application file for complete search history.

(56) References Cited

U.S. PATENT DOCUMENTS

| | | | |
|---|---|---|---|
| 8,774,060 B2 | 7/2014 | Bryant | |
| 8,995,649 B2 | 3/2015 | Koll | |
| 2003/0176178 A1* | 9/2003 | Urata | H04M 1/72513 455/334 |
| 2005/0021344 A1* | 1/2005 | Davis | G10L 13/00 704/277 |
| 2006/0126821 A1* | 6/2006 | Sahashi | H04M 3/51 379/430 |
| 2010/0159830 A1* | 6/2010 | Findlay | H04M 3/56 455/416 |
| 2013/0117693 A1 | 5/2013 | Anderson et al. | |
| 2014/0105411 A1* | 4/2014 | Santos | H04R 3/005 381/66 |
| 2014/0161274 A1 | 6/2014 | Singamsetty et al. | |
| 2014/0288927 A1 | 9/2014 | Klug | |
| 2015/0105022 A1 | 4/2015 | Jung | |
| 2015/0124058 A1 | 5/2015 | Okpeva et al. | |
| 2015/0373171 A1* | 12/2015 | Marimuthu | H04M 3/493 348/14.08 |
| 2016/0036962 A1* | 2/2016 | Rand | H04M 1/72442 455/418 |
| 2018/0152557 A1 | 5/2018 | White et al. | |

FOREIGN PATENT DOCUMENTS

| | | |
|---|---|---|
| WO | 2014062842 A1 | 4/2014 |
| WO | 2014190094 A1 | 11/2014 |

OTHER PUBLICATIONS

Extended European Search Report issued in European Patent Application No. 16180940.5, dated Sep. 26, 2016.

* cited by examiner

SYSTEM FOR AUDIO COMMUNICATION USING LTE

FIELD

The present disclosure relates to a method, a first electronic audio device and a system comprising at least a first electronic audio device and a second electronic audio device for performing audio communication between at least the first electronic audio device and the second electronic audio device. The electronic audio devices are configured for wireless communication via a wireless connection. The electronic audio devices are configured to transmit and/or receive audio directly between them via the wireless connection.

BACKGROUND

US2013117693A discloses a method comprising receiving, at a first media output device, streaming media from a media source device, receiving, at the first media output device, a command by motion or voice to share the streaming media with a second media output device, and initiating, by the first media output device, sharing of the streaming media between the first media output device and the second media output device.

US2015105022A discloses a multitasking system of a Bluetooth headset, which enables users to talk with each other in a telephone call while at the same time enjoying media content played by an external Bluetooth device. The multitasking system of a Bluetooth headset includes: a first Bluetooth headset worn by a first user, and a second Bluetooth headset worn by a second user. The first Bluetooth headset is configured to include a first Bluetooth module, and a second Bluetooth module that is connected to the first Bluetooth module. The second Bluetooth headset is configured to include a third Bluetooth module that is paired with the first Bluetooth module, and a fourth Bluetooth module that is connected to the third Bluetooth module.

SUMMARY

There is a need for an improved system for audio communication between electronic audio devices, such as headsets, earphones and/or speakerphones, which allows for a variety of ways and modes to transmit audio between the devices.

Disclosed is a system comprising at least a first electronic audio device and a second electronic audio device for performing audio communication between at least the first electronic audio device and the second electronic audio device. The electronic audio devices are configured for wireless communication via a wireless connection. The electronic audio devices are configured to transmit and/or receive audio directly between them via the wireless connection. The electronic audio devices comprise a speaker and a microphone. At least the first electronic audio device is configured to operate and/or communicate in at least three modes for controlling audio to be transmitted from the first electronic audio device to the speaker of the second electronic audio device: a first mode where the transmitted audio is, such as solely, an output from the speaker in the first electronic audio device; a second mode where the transmitted audio is, such as solely, an input from the microphone in the first electronic audio device; a third mode where the transmitted audio is, such as both, an output from the speaker of the first electronic audio device and an input from the microphone of the first electronic audio device.

Also disclosed is a first electronic audio device for performing audio communication with a second electronic audio device. The first electronic audio device is configured for wireless communication with the second electronic audio device via a wireless connection. The first electronic audio device is configured to transmit and/or receive audio directly to/from the second electronic audio device via the wireless connection. The first electronic audio device comprises a speaker and a microphone. The first electronic audio device is configured to operate and/or communicate in at least three modes for controlling audio to be transmitted from the first electronic audio device to a speaker of the second electronic audio device: a first mode where the transmitted audio is, such as solely, an output from the speaker in the first electronic audio device; a second mode where the transmitted audio is, such as solely, an input from the microphone in the first electronic audio device; a third mode where the transmitted audio is, such as both, an output from the speaker of the first electronic audio device and an input from the microphone of the first electronic audio device.

Also disclosed is a method for performing audio communication between at least a first electronic audio device and a second electronic audio device. The electronic audio devices comprise a speaker and a microphone. The method comprises establishing a wireless connection between at least the first electronic audio device and the second electronic audio device for performing wireless communication. The electronic audio devices are configured to transmit and/or receive audio directly between them via the wireless connection. The method comprises selecting a mode, in which at least the first electronic audio device is configured to operate and/or communicate in, from at least three modes for controlling audio to be transmitted from the first electronic audio device to the speaker of the second electronic audio device. The modes are a first mode where the transmitted audio is, such as solely, an output from the speaker in the first electronic audio device; a second mode where the transmitted audio is, such as solely, an input from the microphone in the first electronic audio device; a third mode where the transmitted audio is, such as both, an output from the speaker of the first electronic audio device and an input from the microphone of the first electronic audio device. The method comprises transmitting audio from the first electronic audio device to the speaker of the second electronic audio device in accordance with the selected mode.

It is an advantage that the first and the second electronic audio devices are configured to communicate wirelessly to transmit audio without using telephone operators.

It is an advantage that the electronic audio devices are configured to operate in different modes for controlling the audio to be transmitted, as this enables the user of the first electronic audio device to decide and control which audio from his/hers electronic audio device he/she wishes to share with the user of the second electronic audio device.

It is an advantage that the first and the second electronic audio devices are configured to transmit audio both on long distances and on short distances. Thus when the first and the second electronic audio devices are arranged a long distances from each other they may transmit audio to each other using a long distance telecommunications technology/network, such as LTE, 4G, 3G, 2G etc. Thus it is an advantage that the users of the first and second electronic audio device may transmit audio to each other when they are a long distance from each other, such as in different ends of a large building, such as in two different buildings, such as in different geographical areas/locations, such as in different cities, such as in different regions of a country, such as in different countries etc.

It is an advantage that when the first and the second electronic audio devices are arranged a short distances from each other, they may transmit audio to each other using a short distance telecommunications technology/network, such as Wi-Fi, LAN, Bluetooth (BT), Bluetooth Low Energy (BLE) etc. A short distance may be such as less than 10 meters, less than 100 meters etc.

It is an advantage that the method and the electronic audio devices provide a security arrangement or solution for controlling the audio to be transmitted. The first and the second electronic audio device may perform an identification exchange and verification, e.g. by exchanging and verifying electronic access keys, before the audio transmission between the two electronic audio devices.

The first electronic audio device and/or the second electronic audio device may be headsets, earphones, loudspeakers, and/or speakerphones.

The wireless communication may use or may be a mobile telecommunications technology, such as a telecommunications technology for communicating over long distances or long ranges, such as using the Long-Term Evolution (LTE) standard, and/or 4G, 3G, and/or 2G standard. The LTE and/or 4G, 3G, 2G may be used together with a cloud service.

A long distance telecommunications technology may be configured for telecommunication over more than 10 meters, over more than 100 meters, over more than 1000 meters, over more than 10 kilometre, over more than 100 kilometres, over more than 1000 kilometres, over more than 10000 kilometres, over more 100000 kilometres. A long distance telecommunications technology may be configured for telecommunication over an unlimited distance, such as covering the whole Earth.

The wireless communication may use or may be a telecommunications technology for communicating over short distances or short ranges, such as using the Wi-Fi standard, LAN, Bluetooth (BT), and/or Bluetooth Low Energy (BLE) etc. A short distance telecommunications technology may be configured for telecommunication under less than 1000 meters, under less than 500 meters, under less than 100 meters, under less than 50 meters, under less than 10 meters, under less than 5 meters, under less than 1 meter.

The wireless connection may be via the telecommunications technology, e.g. via long distance communications, such as LTE standard, 4G, 3G, 2G etc., and/or via short distance communications, such as Wi-Fi, LAN, BT, BLE etc.

Audio communication is communication configured for transmitting and/or receiving audio. Audio may be sound, voice, speech, speak, media content such as streamed audio, such as radio, music, TV, video, phone conversations etc.

The electronic audio devices are configured to transmit and/or receive audio directly between them via the wireless connection. To transmit and/or receive audio directly may mean not using a mobile operator or telephone operator, it may mean that the wireless communication is "on top" of a mobile operator or telephone operator bound communication. Thus the transmission of audio may be independent of softphone client services and/or mobile phone operators. To transmit and/or receive audio directly can be that it is a second layer audio stream which may be operated and/or controlled in unison with the mobile and/or telephone operator. In case the electronic audio devices are so-called Jabra® (trademark) headsets, the mobile or telephone operator may give Jabra access to an extra or second overlay audio line, and Jabra then for instance controls what type or part of the audio to be sent and when. Different ways to interplay, compete, and/or cooperate between the system provider, e.g. Jabra, and/or electronic audio devices, e.g. Jabra headsets, on one side and the mobile operator and/or telephone operator on the other side.

The electronic audio devices comprise a speaker and a microphone. Thus each electronic audio device may comprise a speaker or an output transducer or a receiver or a loudspeaker. Thus each electronic audio device may comprise a microphone or an input transducer. The speaker is configured for transmitting audio to the ear of the user of the electronic audio device. The microphone is configured for capturing the voice of the user of the electronic audio device. In some embodiments the first electronic audio device comprises a speaker and a microphone, and the second electronic audio device comprises a speaker, but no microphone.

The first and second electronic audio device may comprise a wireless communication unit for enabling the wireless communication. Each wireless communication unit may comprise a transmitter, a receiver, a transmitter-receiver pair, such as a transceiver, a radio unit etc.

At least the first electronic audio device is configured to operate and/or communicate in at least three modes for controlling audio to be transmitted and/or received from the first electronic audio device to the speaker of the second electronic audio device. Controlling audio to be transmitted and/received may be controlling the source of the audio or where the audio is coming from and/or controlling the target of the audio or where the audio is sent to.

In the first mode the transmitted audio is an output from the speaker in the first electronic audio device, such as solely an output from the speaker of the first electronic audio device. By solely is meant only and exclusively, thus the transmitted audio may only be the output from the speaker in the first electronic audio device, not the input from the microphone in the first electronic audio device for example.

In the second mode the transmitted audio is an input from the microphone in the first electronic audio device, such as such as solely an input from the microphone of the first electronic audio device. By solely is meant only and exclusively, thus the transmitted audio may only be the input from the microphone in the first electronic audio device, not the output from the speaker in the first electronic audio device for example.

In the third mode the transmitted audio is/are an output from the speaker of the first electronic audio device and an input from the microphone of the first electronic audio device, such as both an output from the speaker of the first electronic audio device and an input from the microphone of the first electronic audio device. By both is meant that the transmitted audio is transmitted from the speaker and from the microphone of the first electronic audio device at the same time, such as simultaneously, such as parallel, such as serial, such as using the same channel, such as using different channels, such as the audio sent at the same time point from the first electronic audio device is arriving at the same time point in the speaker of the second electronic audio device, such as substantially simultaneously where the audio is arriving at almost the same time point in the speaker of the second electronic audio device as sent from the first electronic audio device but with a delay, such as a delay of milliseconds or seconds, such as few second.

At least the second electronic audio device is configured to operate and/or communicate in at least three modes for controlling audio to be transmitted from the second electronic audio device to the speaker of the first electronic audio device. The three modes may be: a first mode where the transmitted audio is, such as solely, an output from the speaker in the second electronic audio device; a second mode where the transmitted audio is, such as solely, an input from the microphone in the second electronic audio device; a third mode where the transmitted audio is, such as both, an output from the speaker of the second electronic audio device and an input from the microphone of the second electronic audio device.

More electronic devices may be part of the system, such as a third electronic audio device, and a fourth electronic device. All the electronic audio devices may be configured to transmit and/or receive audio between each other.

The three modes may be the same modes or similar modes for the first and the second electronic audio device. If a third and/or fourth and/or more electronic audio device are also part of the system, the three modes may be the same modes or similar modes for all the electronic audio devices.

The first mode may be suitable for transmitting streamed audio, such as music or media from a Bluetooth profile called Advanced Audio Distribution Profile (A2DP), from the speaker of the first electronic audio device to the speaker of the second electronic audio device. The Advanced Audio Distribution Profile (A2DP) is a profile which defines how multimedia audio can be streamed from one device to another over a Bluetooth connection, also called Bluetooth Audio Streaming. For example, music can be streamed from a mobile phone, to a wireless headset, hearing aid/cochlear implant streamer, car audio, or from a laptop/desktop to a wireless headset. Alternatively and/or additionally, voice can be streamed from a microphone device to a recorder on a PC. The Audio/Video Remote Control Profile (AVRCP) may be used in conjunction with A2DP for remote control on devices such as headphones, car audio systems, or stand-alone speaker units. These systems may also implement Headset (HSP) or Hands-Free (HFP) profiles for telephone calls, which may be used separately. Each A2DP service, of possibly many, is designed to uni-directionally transfer an audio stream in up to 2 channel stereo, either to or from the Bluetooth host. This profile relies on AVDTP and GAVDP. It includes mandatory support for the low-complexity SBC codec (not to be confused with Bluetooth's voice-signal codecs such as CVSDM), and supports optionally MPEG-1 Part 3/MPEG-2 Part 3 (MP2 and MP3), MPEG-2 Part 7/MPEG-4 Part 3 (AAC and HE-AAC), and ATRAC, and is extensible to support manufacturer-defined codecs, such as aptX.

Thus it is an advantage that audio streamed via Bluetooth from e.g. a mobile phone to the speaker of the first electronic audio device can be transmitted to the speaker of the second electronic audio device. In this way the user of the first electronic audio device can share his/her audio from his/her mobile phone with the user of the second electronic audio device. The audio from the mobile phone may be music from a music streaming service, such as Spotify®. Thus the user of the second electronic audio device does not need to have and pay for his/her own access to the streaming service, he/she can listen to the music from the streaming service via the access to the streaming service of the user of the first electronic audio device. The user of the first electronic audio device and the user of the second electronic audio device do not have to be close to each other physically in order for this transmission to work, as the wireless communication may be a long distance telecommunications standard, such as LTE or 4G, thus the first electronic audio device and the second electronic audio device can be in two different parts of the world and still share audio.

The second mode may be suitable for transmitting the audio from the surroundings captured by the microphone of the first electronic audio device to the speaker of the second electronic audio device. This is an advantage if e.g. the user of the first electronic audio device is hearing impaired, then by transmitting the audio input from the hearing impaired persons electronic audio device, the first electronic audio device, to the speaker of the second electronic audio device, then the user of the second electronic audio device can repeat or explain with his/her voice what the microphone input in the first electronic audio device is, and the voice or speak of the user of the second electronic audio device can then be processed in a "speech to text" program and presented to the user of the first electronic audio device as text.

The third mode may be suitable for sharing a phone conversation between the user of the first electronic audio device and a far-end caller with the user of the second electronic audio device as the transmitted audio is both an output from the speaker of the first electronic audio device and an input from the microphone of the first electronic audio device. Thus the user of the second electronic audio device can both hear what the far-end caller says, as this is transmitted from the speaker of the first electronic audio device, and hear what the user of the first electronic audio device says, as this is transmitted from the microphone input in the first electronic audio device.

LTE (Long-Term Evolution, commonly marketed as 4G LTE) is a standard for wireless communication of high-speed data for mobile phones and data terminals. It is based on the GSM/EDGE and UMTS/HSPA network technologies, increasing the capacity and speed using a different radio interface together with core network improvements.

LTE may increase the capacity and speed of wireless data networks using new DSP (digital signal processing) techniques and modulations.

The LTE specification provides downlink peak rates of 300 Mbit/s, uplink peak rates of 75 Mbit/s and QoS provisions permitting a transfer latency of less than 5 ms in the radio access network. LTE has the ability to manage fast-moving mobiles and supports multi-cast and broadcast streams.

The LTE standard covers a range of many different bands, each of which is designated by both a frequency and a band number. In North America, 700, 750, 800, 850, 1900, 1700/2100 (AWS), 2300 (WCS) 2500 and 2600 MHz (Rogers Communications, Bell Canada) are used (bands 2, 4, 5, 7, 12, 13, 17, 25, 26, 30, 41); 2500 MHz in South America; 700, 800, 900, 1800, 2600 MHz in Europe (bands 3, 7, 20); 800, 1800 and 2600 MHz in Asia (bands 1, 3, 5, 7, 8, 11, 13, 40) and 1800 MHz and 2300 MHz in Australia and New Zealand (bands 3, 40).

In some embodiments the electronic audio devices are configured to transmit and/or receive audio directly between them by further using a cloud service. The cloud service may be a system specific cloud service such as a Jabra communication cloud service. Further, the transmitted audio can be stored, such as in the cloud service, such as in a remote data storage, such as in a remote storage area network, such as in a data storage of the cloud service. Further, the transmitted audio can be stored locally in the first and/or second electronic audio device or in electronic content devices, such in as mobile phones, smarts phones, tablets, laptops, PCs etc., associated with the electronic audio devices.

In some embodiments the wireless connection is a long distance mobile telecommunications technology, such as Long-Term Evolution (LTE). The long distance mobile telecommunications technology may alternatively and/or additionally be 4G, 3G or 2G. The wireless connection may alternatively and/or additionally be a short distance mobile telecommunications technology, such as Wi-Fi, LAN, BT, BLE etc.

In some embodiments each of the electronic audio devices comprises an Internet-of-Things (IoT) gateway (GW) device and/or chip and/or component configured for providing the wireless connection using the cloud service. Thus an IoT gateway hardware chip, such as from Greenwave, may be implemented in the first and second electronic audio devices for providing the audio communication between the electronic audio devices via e.g. the long distance wireless communication technology using the cloud service, such as a Jabra communication cloud service. The IoT gateway chip may be battery powered or mains powered.

In some embodiments the system comprises an electronic content device associated with the first electronic audio device and/or the second electronic audio device. In some embodiments the electronic content device comprises a software application. In some embodiments the software application is configured for controlling and/or processing the audio transmitted from the first electronic audio device to the second electronic audio device. The electronic content device may be a mobile phone, smart phone smartphone tablet, personal computer (PC), computer, portable media player etc. The software application may be an Internet webpage or mobile phone application, mobile app, web application, computer program. The software application is installed on the electronic content device, such as mobile phone, associated with the electronic audio device, and/or on a personal computer or tablet associated with the electronic audio device. The software application may be a Jabra WebRTC or Jabra APP. Thus the software application, such as an app for a smartphone, may provide means for controlling and/or processing the audio to be transmitted. Thus it is an advantage that the electronic content device associated with the first electronic audio device may control and/or process the audio transmitted between the electronic audio devices. Processing of the transmitted audio may comprise transferring the audio into text. The audio transmission may alternatively and/or additionally be controlled via gestures or communication commands of the user and/or via button controls directly on the electronic audio device itself and/or via button controls directly on the electronic content device. Thus switching between the modes, e.g. between the first and second mode, may also be performed via software application, gestures, communication commands and/or buttons. The electronic content device may be a non-wearable device, such as smartphone, and/or a wearable device, such as a smart-wrist watch and/or a wearable-on-other-parts-of-the-body electronic smart-display devices.

The gestures or communication commands can be via bite, breath, Morse-codes' via light amount when the user is opening/closing his/her mouth or using other human bio-indicators depending on where the electronic audio device and/or electronic content device is worn on the body of the user.

In some embodiments the cloud service is configured to control an access key system. In some embodiments the access key system is configured to exchange access keys between the electronic audio devices for enabling audio transmission between the first and the second electronic audio devices. The cloud service is configured to control and/or communicate the access key system. The access key system is configured to exchange access keys and/or provide verification of the access keys. Thus it is an advantage to provide an access key system which is a security arrangement. Only the user of the first electronic audio device may initiate the audio transmission from the speaker and/or microphone of the first electronic audio device. Likewise, only the user of the second electronic audio device may initiate the audio transmission from the speaker and/or microphone of the second electronic audio device. Thus only the audio owner can transmit his/her own audio, i.e. the user of the other electronic audio device who is not creating audio but receiving audio cannot tap and/or retrieve audio from the audio owner without the audio owner's permission and awareness.

The user of the electronic audio device which is not creating audio, may however request the audio owner to share his/her audio, e.g. by "pinging" the user of the electronic audio device creating or owning the audio.

In some embodiments in the first mode, where the transmitted audio is e.g. solely an output from the speaker in the first electronic audio device, the transmitted audio is audio that is streamed from an electronic content device associated with the first electronic device, into the speaker of the first electronic device is configured to be transmitted into the speaker of the second electronic audio device. The streamed audio may be music and/or media content streamed via the Bluetooth protocol A2DP. The electronic content device may be a non-wearable device or a wearable device, such as a mobile phone, smartphone tablet, personal computer, computer, portable media player, smart wrist watch etc. It is an advantage that this 'long distance audio linking' concept provides that music or media content, e.g. via A2DP, which is streamed from the electronic content device associated with the first electronic audio device into the speaker of the first electronic audio device can be shared with the user of the second electronic audio device by transmission of the streamed audio into the speaker of the second electronic audio device. This enables two people to audio link their music and/or media even though they are far apart and not using same music and/or media provider.

In some embodiments in the first mode, where the transmitted audio is e.g. solely an output from the speaker in the first electronic audio device, the audio is audio from a phone conversation with a far-end caller received in the speaker of the first electronic device. Thus the call-audio from a phone conversation in the first electronic audio device may be transmitted via a 'SCO-link', thus the audio is the received audio from a phone call conversation, that is the audio which is streamed when it is speaker-output alone that is transferred. The SCO (Synchronous Connection-Oriented) link is a type of radio link used for voice data. A SCO link is a set of reserved timeslots on an existing ACL transport. Each device transmits encoded voice data in the reserved timeslot. There are no retransmissions, but forward error correction can be optionally applied. SCO packets may be sent every 1, 2 or 3 timeslots. Unlike ACL, SCO data is streamed instead of framed, so no distinction may exist between SCO logical transports and logical links. The SCO link may be an enhanced SCO link (eSCO), which links allow greater flexibility in setting up links. They may use retransmissions to achieve reliability, allow a wider variety of packet types, and greater intervals between packets than SCO, thus increasing radio availability for other link. An advantage of this use case 'long distance listen-in using SCO link' where the user of the first electronic audio device is having a phone call on his/her BT-connected mobile phone, is that the audio from the far-end caller in the phone conversation is transmitted to the speaker of the second electronic audio device, i.e. this enables the user of the second electronic audio device to listen-in on the phone conversation of the user of the first electronic audio device. The user of the second electronic audio device may not be able to talk in 'on top' of this phone conversation. Further the user of the second electronic audio device may not be able to hear the voice of the user of the first electronic audio device, as the microphone output from the speaker of the first electronic audio device may not be transmitted in this use case or mode. Alternatively and/or additionally, the first electronic audio device and/or the second electronic audio device may comprise a processor for processing the audio. The processer may use processing power. The processing power may be from the electronic audio device itself and/or from an associated electronic content device. The processing could be e.g. using a so-called 'speech to text' feature. Both for A2DP and/or SCO-link for the first mode, and/or for the second mode and/or for the third mode the 'speech to text' feature, engine, software application or app may be applied for processing.

In some embodiments in the second mode, where the transmitted audio is e.g. solely an input from the microphone in the first electronic audio device, the audio is audio picked up by the microphone of the first electronic audio device. The case may be a phone conversation in the first electronic audio device with far-end caller, whereby the user of the second electronic audio device only hears what the user of the first electronic audio device is saying in the microphone of the first electronic audio device, but not hearing what the far-end caller says as the speaker output from the first electronic audio device may not be transmitted in the second mode. Further, the user of the second electronic audio device may not be able to speak in on the conversation.

In some embodiments in the second mode, where the transmitted audio is e.g. solely an input from the microphone in the first electronic audio device, the audio is audio picked up by the microphone of the first electronic audio device and transmitted to the speaker of the second electronic audio device, whereby the audio received in the speaker of the second electronic audio device is configured to be presented and/or processed by a user of the second electronic audio device, and wherein the content of the audio is configured to be transmitted back to a user of the first electronic audio device. An advantage of this use, which may be a so-called "be my ears" concept, the user of the first electronic audio device may be hearing impaired, so the user of the second electronic audio device may listen for the user of the first electronic audio device, which may be explained as being the 'ears' of the user of the first electronic audio device. The audio presented or processed by a user of the second electronic audio may be repeated, translated, commented, selected, explained etc. For example in the first electronic audio device, the microphone may be constantly activated and hence listening to the surroundings. In this example there may be no phone call. The first electronic audio device transmits this microphone input alone to the speaker of the second electronic audio device. The user of the second electronic audio device may then say what he/she hears in his/her speaker, which is from the microphone input in the first electronic audio device. This voice input from the user of the second electronic audio device via the microphone input of the second electronic audio device may be input via a 'speech to text' plug-in in an app, such as in a Jabra communication app, such as via a 'be my ears' plug-in in the app, and may then directly be sent to the same 'speech to text' plug-in in an electronic content device associated with the first electronic audio device. Then the user of the first electronic audio device can read the text of the audio on e.g. the electronic content device, which may be wearable or non-wearable. The "speech to text" transferring can be performed in an app on the/an electronic content device associated with the first electronic audio device and/or with the second electronic audio device.

Thus the "speech to text" and/or "be my ears" software applications or apps can be placed and/or activated in different locations such as in the first or second electronic audio device, and/or in a third, fourth etc. electronic audio device, and/or in an electronic content device, and/or in a cloud, such as in a cloud storage etc. Further, the presentation or display of the text from the "speech to text" and/or "be my ears" software applications or apps can be displayed, placed and/or activated in different locations such as in a display on the first or second electronic audio device, such as on a display at the user's eyes on a headset, and/or in a third, fourth etc. electronic audio device, and/or in a display on a headset base station, and/or in a display in an electronic content device, such as a display on a smartphone or pc etc.

In some embodiments in the second mode the content of the audio is transmitted back to the user of the first electronic audio device in form of text displayed on an electronic content device. Thus this may comprise using the "speech to text" plug in. The electronic content device where the text is displayed may be a wearable device, such as a smart wrist watch, and/or a non-wearable device, such as mobile phone, pc, tablet or dedicated text display device etc.

In some embodiments in the second mode the content of the audio is transmitted back to the user of the first electronic audio device in form of processed audio, such as by the user of the second electronic audio device repeating, translating, commenting, selecting, and/or explaining the received audio to the user of the first electronic audio device. Thus the second mode may alternatively and/or additionally be used even if the user of the first electronic audio device is not hearing impaired. It is an advantage that the user of the second electronic audio device can comment on the audio, e.g. in case of a meeting; and/or the user of the second electronic audio device can translate the audio in case the user of the first electronic audio device does not understand the language spoken to him/her, and/or the user of the second electronic audio device can repeat selected words in case the user of the first electronic audio device is hearing impaired etc.

In some embodiments in the third mode, where the transmitted audio is both an output from the speaker of the first electronic audio device and an input from the microphone of the first electronic audio device, the audio in the speaker of the first electronic device is configured to be transmitted into the speaker of the second electronic audio device simultaneously and/or concurrently with the audio from microphone input, such as voice/speech of the user, of the first electronic audio device being transmitted to the speaker of the second electronic audio device. The audio may be music and/or media via the A2DP protocol and/or speech from a phone conversation. It is an advantage that the user of the first electronic audio device can speak/talk over or on top of the audio from the speaker of the first electronic audio device, such that the user of the second electronic audio device can receive both audio from the speaker of the first electronic audio device and the speak/voice/speech of the user of the first electronic audio device. The audio in the speaker of the first electronic device is configured to be transmitted into the speaker of the second electronic audio device substantially simultaneously and/or concurrently with the audio from microphone input, such as where the audio from the speaker in the first electronic audio device is arriving at almost the same time point in the speaker of the second electronic audio device as the audio from the microphone input is arriving, but with a delay, such as a delay of milliseconds or seconds, such as few second(s).

In some embodiments in the first mode and/or in the second mode and/or in the third mode the audio is streamed from an electronic content device associated with the first electronic device, into the speaker of the first electronic device. In the third mode and in case the audio streamed is music or media via the A2DP protocol, an advantage of this use case is that it provides for 'second layer speak', as the user of the first electronic audio device can speak 'on top' of what he/she is listening to of music and/or media (A2DP) from his/her BT-connected mobile phone. Thus both microphone input, which is the speak of the user of the first electronic audio device, and speaker output, which is the music and/or media from the BT-connected phone associated with the user of the first electronic audio device, is transmitted to the speaker of the second electronic audio device, hereby enabling the user of the first electronic audio device to live-comment on his/her music, and/or on a voice recording of a meeting and/or comment on e.g. a media content, such as TV show etc. etc. The user of the second electronic audio device may also be enabled to talk back by that the microphone input of the second electronic audio device is transmitted to the speaker of the first electronic audio device, which may then be as a second layer on top of the A2DP-stream already received in the speaker of the first electronic audio device. The electronic content device may be a mobile phone, tablet, personal computer, computer, portable media player etc.

In some embodiments in the first mode and/or in the second mode and/or in the third mode the audio is from a phone conversation with a far-end caller received in the speaker of the first electronic device. Thus the audio may be the voice, speak or speech of a far-end caller speaking, such as in a telephone conversation via a BT link, and/or via a SCO link for conversation, and/or via a voice over IP link (VoIP) etc. It is an advantage that in the third mode this use case of 'long distance listen-in' may provide that the user of the first electronic audio device is having a phone call on his/her BT-connected mobile phone. Both the far-end caller in the phone conversation as well as the voice of the user of the first electronic audio device are transmitted to the speaker of the second electronic audio device enabling the user of the second electronic audio device to listen-in on the phone conversation of the user of the first electronic audio device. The user of the second electronic audio device can again talk in 'on top' of this conversation, without being present in the call, i.e. his/her microphone input may be transmitted to the speaker of the first electronic audio device, but without the far-end caller being able to hear this.

In some embodiments the system is configured for transmitting audio from the first electronic audio device to the second electronic audio device immediately or delayed. Thus the transmission of audio may be in real time, on-the-fly etc. The user of the second electronic audio device may receive a ping warning that audio is ready to be transmitted, and the user can select to receive the audio now or later. The ping warning may contain information about whether the transmission is urgent, important, "can wait", is a private character, work related etc. Typically the audio will be transmitted immediately, however e.g. in case of a non-urgent transmission and/or e.g. due to time differences, the transmission of audio may be deliberately delayed. To be able to transmit audio delayed, the audio should be stored, e.g. in a cloud service storage, in the first and/or second electronic audio device, in an electronic content device associated with the first and second electronic audio device etc. The delay can be very short such as milliseconds or seconds, or the delay can be a longer delay such as minutes, hours, days etc.

In some embodiments the system is configured for storing the transmitted audio from the first electronic audio device to the second electronic audio device, such as storing remotely in a cloud service storage and/or storing locally on an electronic content device associated with the first and/or second electronic audio device, and/or storing locally on the first electronic audio device and/or on the second electronic audio device. The electronic content device may be a mobile phone, tablet, personal computer, computer, portable media player, smart wrist watch etc. In order to be able to rehear or listen again to the audio already transmitted between the electronic audio devices, the audio may be stored. In order to transmit the audio delayed, the audio may also be stored.

The present invention relates to different aspects including the system described above and in the following, and corresponding system parts, methods, devices, systems, networks, kits, uses and/or product means, each yielding one or more of the benefits and advantages described in connection with the first mentioned aspect, and each having one or more embodiments corresponding to the embodiments described in connection with the first mentioned aspect and/or disclosed in the appended claims.

BRIEF DESCRIPTION OF THE DRAWINGS

The above and other features and advantages will become readily apparent to those skilled in the art by the following detailed description of exemplary embodiments thereof with reference to the attached drawings, in which.

DETAILED DESCRIPTION

Figure 1:
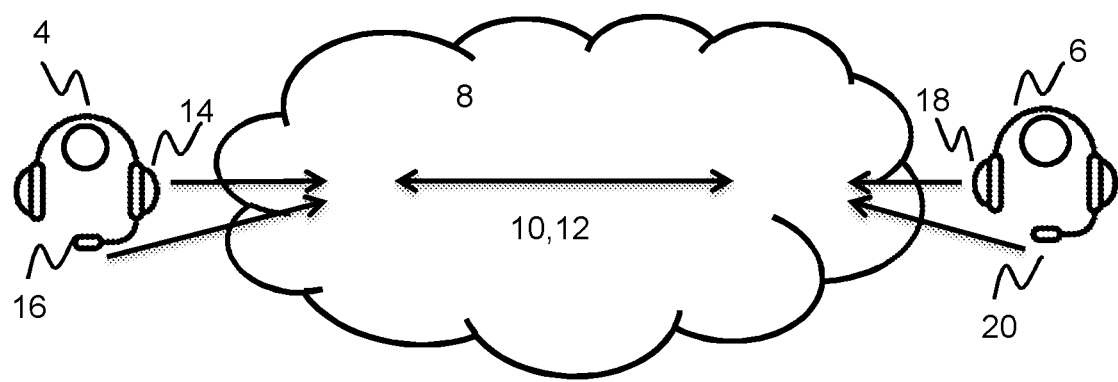
FIG. 1 schematically illustrates an example of a system comprising a first electronic audio device and a second electronic audio device for performing audio communication according to three modes.

Various embodiments are described hereinafter with reference to the figures. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

Throughout, the same reference numerals are used for identical or corresponding parts.

FIG. 1 schematically illustrates an example of a system 2 comprising at least a first electronic audio device 4 and a second electronic audio device 6 for performing audio communication between at least the first electronic audio device 4 and the second electronic audio device 6. The electronic audio devices 4, 6 are configured for wireless communication via a wireless connection 8. The electronic audio devices 4, 6 are configured to transmit 10 and/or receive 12 audio directly between them via the wireless connection. The first electronic audio device 4 comprises a speaker 14 and a microphone 16. The second electronic audio device 6 comprises a speaker 18 and a microphone 20. At least the first electronic audio device 4 is configured to operate in at least three modes for controlling audio to be transmitted from the first electronic audio device 4 to the speaker 18 of the second electronic audio device 6. In a first mode the transmitted audio is an output from the speaker 14 in the first electronic audio device 4. In a second mode the transmitted audio is an input from the microphone 16 in the first electronic audio device 4. In a third mode the transmitted audio is an output from the speaker 14 of the first electronic audio device 4 and an input from the microphone 16 of the first electronic audio device 4.

Figure 2A:
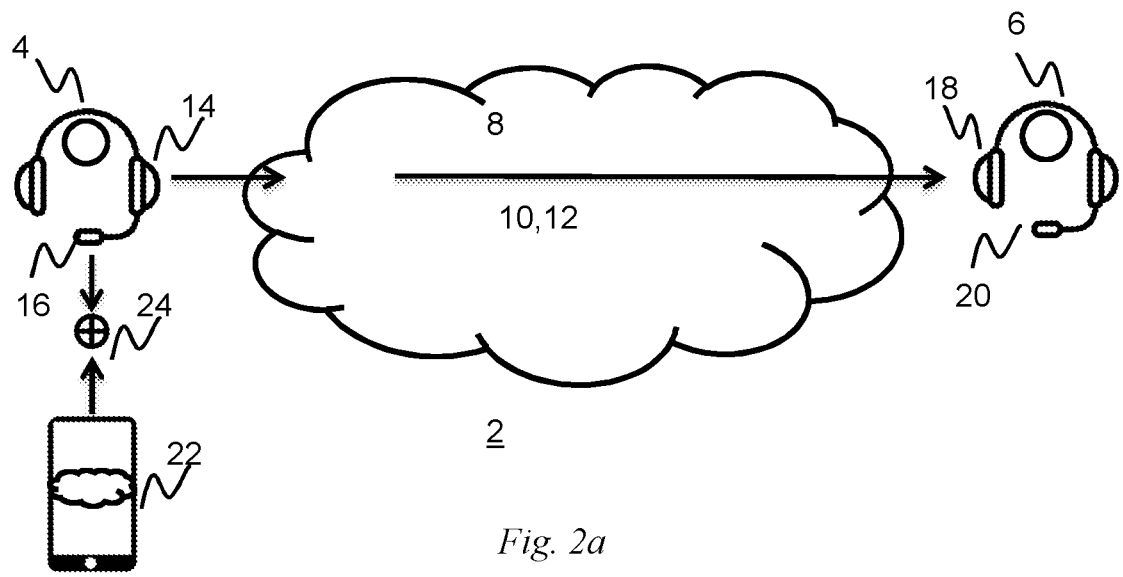
FIG. 2*a*) schematically illustrates an example of a system comprising a first electronic audio device and a second electronic audio device for performing audio communication according to a first mode.

FIG. 2a) schematically illustrates an example of a system 2 comprising at least a first electronic audio device 4 and a second electronic audio device 6 for performing audio communication between at least the first electronic audio device 4 and the second electronic audio device 6. The electronic audio devices 4, 6 are configured for wireless communication via a wireless connection 8. The electronic audio devices 4, 6 are configured to transmit 10 and/or receive 12 audio directly between them via the wireless connection. The first electronic audio device 4 comprises a speaker 14 and a microphone 16. The second electronic audio device 6 comprises a speaker 18 and a microphone 20.

At least the first electronic audio device 4 is configured to operate in at least a first mode for controlling audio to be transmitted from the first electronic audio device 4 to the speaker 18 of the second electronic audio device 6. In the first mode the transmitted audio is an output from the speaker 14 in the first electronic audio device 4.

The first electronic audio device 4 may be associated with a first electronic content device 22. The first electronic content device 22 may be connected wirelessly 24 with the first electronic audio device 4 by means of a short range wireless communications technology, such as BT. Audio, such as the voice of a far-end caller in a phone conversation and/or music and/or media, from the first electronic content device 22 may be streamed to the speaker 14 of the first electronic audio device 4 via the wireless connection 24. The audio in the speaker 14 of the first electronic audio device 4 is transmitted to the speaker 18 of the second electronic audio device 6.

Figure 2B:
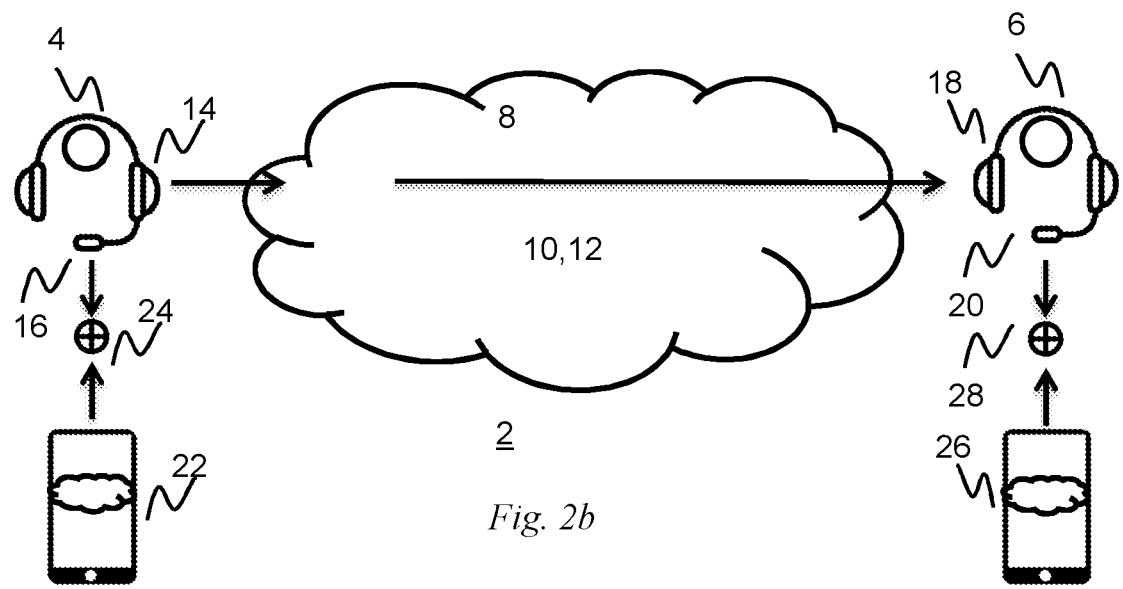
FIG. 2*b*) schematically illustrates an example of a system comprising a first electronic audio device and a second electronic audio device for performing audio communication according to a first mode.

FIG. 2b) schematically illustrates an example of a system 2 comprising at least a first electronic audio device 4 and a second electronic audio device 6 for performing audio communication between at least the first electronic audio device 4 and the second electronic audio device 6. The electronic audio devices 4, 6 are configured for wireless communication via a wireless connection 8. The electronic audio devices 4, 6 are configured to transmit 10 and/or receive 12 audio directly between them via the wireless connection. The first electronic audio device 4 comprises a speaker 14 and a microphone 16. The second electronic audio device 6 comprises a speaker 18 and a microphone 20.

At least the first electronic audio device 4 is configured to operate in at least a first mode for controlling audio to be transmitted from the first electronic audio device 4 to the speaker 18 of the second electronic audio device 6. In the first mode the transmitted audio is an output from the speaker 14 in the first electronic audio device 4. The first electronic audio device 4 may be associated with a first electronic content device 22. The first electronic content device 22 may be connected wirelessly 24 with the first electronic audio device 4 by means of a short range wireless communications technology, such as BT. Audio, such as the voice of a far-end caller in a phone conversation and/or music and/or media, from the first electronic content device 22 may be streamed to the speaker 14 of the first electronic audio device 4 via the wireless connection 24. The audio in the speaker 14 of the first electronic audio device 4 is transmitted to the speaker 18 of the second electronic audio device 6.

The second electronic audio device 6 may be associated with a second electronic content device 26. The second electronic content device 26 may be connected wirelessly 28 with the second electronic audio device 6 by means of a short range wireless communications technology, such as BT. Audio received in the speaker 18 of the second electronic audio device 6 and transmitted from the speaker 14 of the first electronic audio device 4 may be transferred to the second electronic content device 26 via the wireless connection 28. The second electronic content device 26 may comprise a software application or app for transforming "speech to text", thus audio received in the second electronic content device via the wireless connection 28 to the second electronic audio device 6 may be transformed into text to be displayed on e.g. a display on the second electronic content device 26.

Figure 3A:
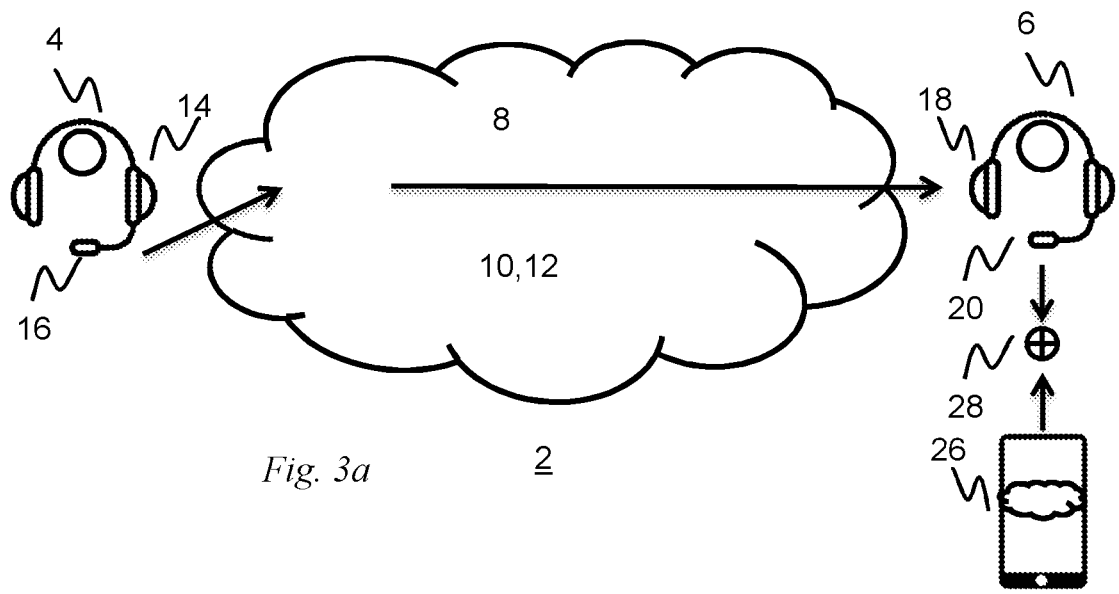
FIG. 3*a*) schematically illustrates an example of a system comprising a first electronic audio device and a second electronic audio device for performing audio communication according to a second mode.

FIG. 3a) schematically illustrates an example of a system 2 comprising at least a first electronic audio device 4 and a second electronic audio device 6 for performing audio communication between at least the first electronic audio device 4 and the second electronic audio device 6. The electronic audio devices 4, 6 are configured for wireless communication via a wireless connection 8. The electronic audio devices 4, 6 are configured to transmit 10 and/or receive 12 audio directly between them via the wireless connection. The first electronic audio device 4 comprises a speaker 14 and a microphone 16. The second electronic audio device 6 comprises a speaker 18 and a microphone 20.

At least the first electronic audio device 4 is configured to operate in at least a second mode for controlling audio to be transmitted from the first electronic audio device 4 to the speaker 18 of the second electronic audio device 6. In the second mode the transmitted audio is an input from the microphone 16 in the first electronic audio device 4.

The second electronic audio device 6 may be associated with a second electronic content device 26. The second electronic content device 26 may be connected wirelessly 28 with the second electronic audio device 6 by means of a short range wireless communications technology, such as BT. Audio received in the speaker 18 of the second electronic audio device 6 and transmitted from the microphone 16 of the first electronic audio device 4, such as the voice of user of the first electronic audio device 4 or the surrounding audio of the user of the first electronic audio device 4, may be transferred to the second electronic content device 26 via the wireless connection 28. The second electronic content device 26 may comprise a software application or app for transforming "speech to text", thus audio received in the second electronic content device via the wireless connection 28 to the second electronic audio device 6 may be transformed into text to be displayed on e.g. a display on the second electronic content device 26. Thus in this case, audio is transmitted from the first electronic audio device 4 to the second electronic audio device 6 via a cloud service. The user of the second electronic audio device 6 may be hearing impaired and thus benefit from having the audio presented as text on the display of the second electronic content device 26.

Figure 3B:
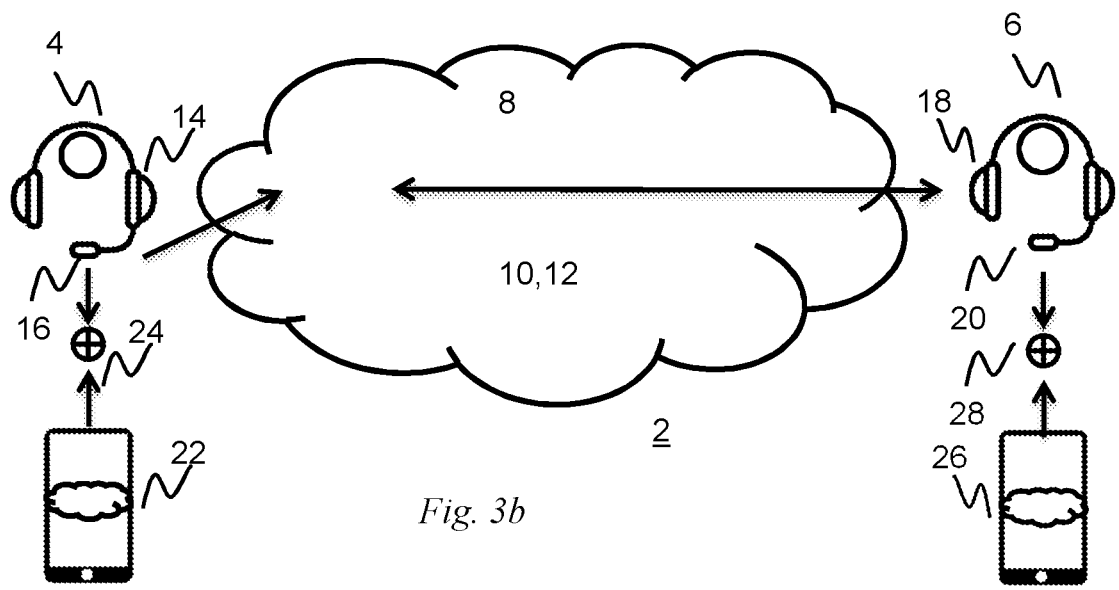
FIG. 3*b*) schematically illustrates an example of a system comprising a first electronic audio device and a second electronic audio device for performing audio communication according to a second mode.

FIG. 3*b*) schematically illustrates an example of a system 2 comprising at least a first electronic audio device 4 and a second electronic audio device 6 for performing audio communication between at least the first electronic audio device 4 and the second electronic audio device 6. The electronic audio devices 4, 6 are configured for wireless communication via a wireless connection 8. The electronic audio devices 4, 6 are configured to transmit 10 and/or receive 12 audio directly between them via the wireless connection. The first electronic audio device 4 comprises a speaker 14 and a microphone 16. The second electronic audio device 6 comprises a speaker 18 and a microphone 20.

At least the first electronic audio device 4 is configured to operate in at least a second mode for controlling audio to be transmitted from the first electronic audio device 4 to the speaker 18 of the second electronic audio device 6. In the second mode the transmitted audio is an input from the microphone 16 in the first electronic audio device 4.

The first electronic audio device 4 may be associated with a first electronic content device 22. The first electronic content device 22 may be connected wirelessly 24 with the first electronic audio device 4 by means of a short range wireless communications technology, such as BT. Audio transmitted from the microphone 16 of the first electronic audio device 4, such as the voice of user of the first electronic audio device 4 or the surrounding audio of the user of the first electronic audio device 4, may be transferred to the first electronic content device 22 via the wireless connection 24. The first electronic content device 22 may comprise a software application or app for transforming "speech to text", thus audio received in the first electronic content device via the wireless connection 24 to the first electronic audio device 4 may be transformed into text to be displayed on e.g. a display on the first electronic content device 22. The text may be transmitted from the first electronic audio device 4 and/or from the first electronic content device 22 to a second electronic content device 26 and/or to the second electronic audio device 6 associated with the second electronic content device 26. The second electronic content device 26 may be connected wirelessly 28 with the second electronic audio device 6 by means of a short range wireless communications technology, such as BT. The second electronic content device 26 may also comprise the software application or app for displaying "speech to text", thus audio transformed into text in the first electronic content device 22 is configured to be displayed on a display on the second electronic content device 26.

Thus in this case, text is transmitted from the first electronic audio device 4 to the second electronic audio device 6 via a cloud service.

The user of the second electronic audio device 6 may be hearing impaired and thus benefit from having the audio input from the microphone 16 of the first electronic audio device 4 presented as text on the display of the second electronic content device 26.

Alternatively and/or additionally the user of the first electronic audio device 4 may be hearing impaired and thus benefit from having the audio input from his/her own microphone 16 of the first electronic audio device 4 presented as text on the display of the first electronic content device 22. The first electronic content device 22 and/or the second electronic content device 26 may provide the speech-to-text transformation.

Figure 4A:
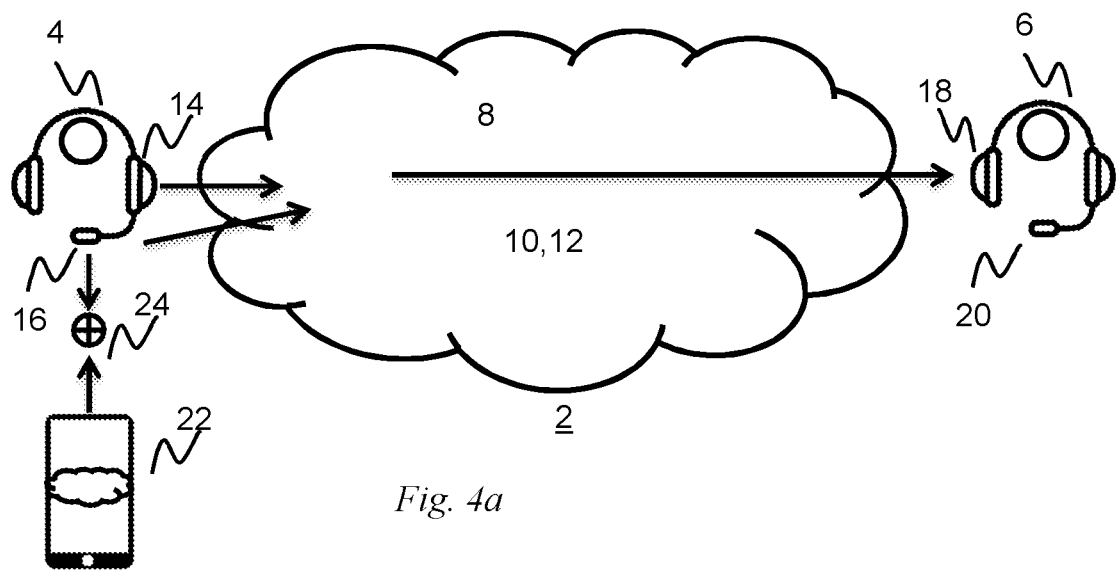
FIG. 4*a*) schematically illustrates an example of a system comprising a first electronic audio device and a second electronic audio device for performing audio communication according to a third mode.

FIG. 4*a*) schematically illustrates an example of a system 2 comprising at least a first electronic audio device 4 and a second electronic audio device 6 for performing audio communication between at least the first electronic audio device 4 and the second electronic audio device 6. The electronic audio devices 4, 6 are configured for wireless communication via a wireless connection 8. The electronic audio devices 4, 6 are configured to transmit 10 and/or receive 12 audio directly between them via the wireless connection. The first electronic audio device 4 comprises a speaker 14 and a microphone 16. The second electronic audio device 6 comprises a speaker 18 and a microphone 20.

At least the first electronic audio device 4 is configured to operate in at least a third mode for controlling audio to be transmitted from the first electronic audio device 4 to the speaker 18 of the second electronic audio device 6. In the third mode the transmitted audio is an output from the speaker 14 of the first electronic audio device 4 and an input from the microphone 16 of the first electronic audio device 4.

The first electronic audio device 4 may be associated with a first electronic content device 22. The first electronic content device 22 may be connected wirelessly 24 with the first electronic audio device 4 by means of a short range wireless communications technology, such as BT. Audio, such as the voice of a far-end caller in a phone conversation and/or music and/or media, from the first electronic content device 22 may be streamed to the speaker 14 of the first electronic audio device 4 via the wireless connection 24. The audio in the speaker 14 of the first electronic audio device 4 is transmitted to the speaker 18 of the second electronic audio device 6.

Audio transmitted from the microphone 16 in the first electronic audio device 4, such as the voice of user of the first electronic audio device 4 or the surrounding audio of the user of the first electronic audio device 4, is also transmitted to the speaker 18 of the second electronic audio device 6.

Figure 4B:
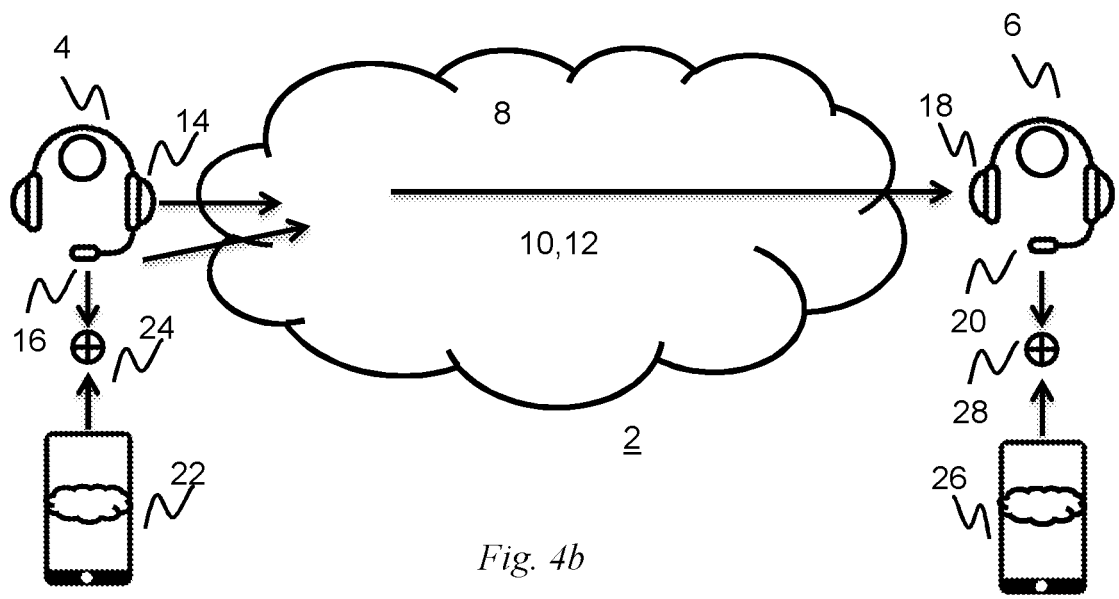
FIG. 4*b*) schematically illustrates an example of a system comprising a first electronic audio device and a second electronic audio device for performing audio communication according to a third mode.

FIG. 4*b*) schematically illustrates an example of a system 2 comprising at least a first electronic audio device 4 and a second electronic audio device 6 for performing audio communication between at least the first electronic audio device 4 and the second electronic audio device 6. The electronic audio devices 4, 6 are configured for wireless communication via a wireless connection 8. The electronic audio devices 4, 6 are configured to transmit 10 and/or receive 12 audio directly between them via the wireless connection. The first electronic audio device 4 comprises a speaker 14 and a microphone 16. The second electronic audio device 6 comprises a speaker 18 and a microphone 20.

At least the first electronic audio device 4 is configured to operate in at least a third mode for controlling audio to be transmitted from the first electronic audio device 4 to the speaker 18 of the second electronic audio device 6. In the third mode the transmitted audio is an output from the speaker 14 of the first electronic audio device 4 and an input from the microphone 16 of the first electronic audio device 4.

The first electronic audio device 4 may be associated with a first electronic content device 22. The first electronic content device 22 may be connected wirelessly 24 with the first electronic audio device 4 by means of a short range wireless communications technology, such as BT. Audio, such as the voice of a far-end caller in a phone conversation and/or music and/or media, from the first electronic content device 22 may be streamed to the speaker 14 of the first electronic audio device 4 via the wireless connection 24. The audio in the speaker 14 of the first electronic audio device 4 is transmitted to the speaker 18 of the second electronic audio device 6.

Audio transmitted from the microphone 16 in the first electronic audio device 4, such as the voice of user of the first electronic audio device 4 or the surrounding audio of the user of the first electronic audio device 4, is also transmitted to the speaker 18 of the second electronic audio device 6.

The second electronic audio device 6 may be associated with a second electronic content device 26. The second electronic content device 26 may be connected wirelessly 28 with the second electronic audio device 6 by means of a short range wireless communications technology, such as BT. Audio received in the speaker 18 of the second electronic audio device 6 and transmitted from both the microphone 16 and the speaker 14 of the first electronic audio device 4 may be transferred to the second electronic content device 26 via the wireless connection 28. The second electronic content device 26 may comprise a software application or app for transforming "speech to text", thus audio received in the second electronic content device via the wireless connection 28 to the second electronic audio device 6 may be transformed into text to be displayed on e.g. a display on the second electronic content device 26.

Figure 5:
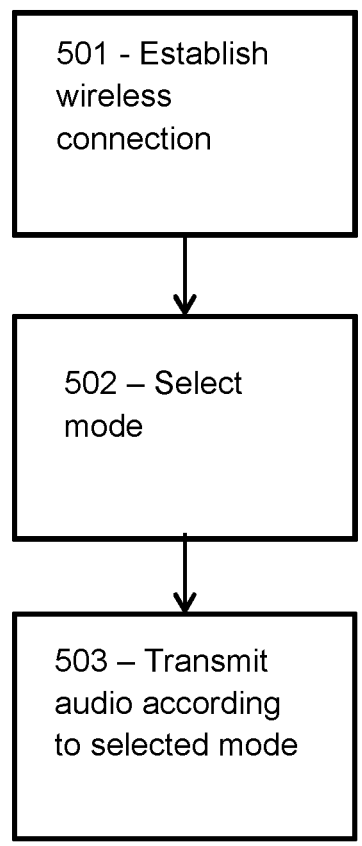
FIG. 5 schematically illustrates a flow chart of a method for performing audio communication between a first electronic audio device and a second electronic audio device.

FIG. 5 schematically illustrates a flow chart of a method 500 for performing audio communication between at least a first electronic audio device and a second electronic audio device. The electronic audio devices comprise a speaker and a microphone. The method 500 comprises:

In step 501 a wireless connection is established between the first electronic audio device and the second electronic audio device for performing wireless communication. The electronic audio devices are configured to transmit and/or receive audio directly between them via the wireless connection.

In step 502 a mode is selected, in which at least the first electronic audio device is configured to operate in, from at least three modes for controlling audio to be transmitted from the first electronic audio device to the speaker of the second electronic audio device. The modes are: a first mode where the transmitted audio is an output from the speaker in the first electronic audio device; a second mode where the transmitted audio is an input from the microphone in the first electronic audio device; a third mode where the transmitted audio is an output from the speaker of the first electronic audio device and an input from the microphone of the first electronic audio device.

In step 503 audio is transmitted from the first electronic audio device to the speaker of the second electronic audio device in accordance with the selected mode.

Although particular features have been shown and described, it will be understood that they are not intended to limit the claimed invention, and it will be made obvious to those skilled in the art that various changes and modifications may be made without departing from the scope of the claimed invention. The specification and drawings are, accordingly to be regarded in an illustrative rather than restrictive sense. The claimed invention is intended to cover all alternatives, modifications and equivalents.

LIST OF REFERENCES 2 system
4 first electronic audio device
6 second electronic audio device
8 long range wireless connection between first electronic audio device and second electronic audio device
10 audio transmission
12 audio reception
14 speaker of first electronic audio device
16 microphone of first electronic audio device
18 speaker of second electronic audio device
20 microphone of second electronic audio device
22 first electronic content device
24 short range wireless connection between first electronic audio device and first electronic content device
26 second electronic content device
28 short range wireless connection between second electronic audio device and second electronic content device
500 method for performing audio communication between at least a first electronic audio device and a second electronic audio device
501 method step of establishing a wireless connection
502 method step of selecting a mode
503 method step of transmitting audio

The invention claimed is:

1. A hearing assist system comprising
at least a first electronic audio device useable by a first user, and a second electronic audio device useable by a second user, for performing audio communication between at least the first user via the first electronic audio device and the second user via second electronic audio device, said first electronic audio device also capable of being electronically connected with a far end party to engage in a conversation between the first user and the party;
wherein audio generated by a party is considered the audio's owner and is controllable by said owner with respect to which other party may hear it;
wherein the first and second electronic audio devices are configured for wireless communication therebetween via a wireless connection,
wherein the first and second electronic audio devices are configured to transmit and/or receive audio directly between each other via the wireless connection;
wherein the first and second electronic audio devices include a speaker and a microphone;

wherein at least the first electronic audio device is configured to operate wherein audio is transmitted between the far end user and the first user via the first electronic audio device;

the audio is picked up by the microphone of the first electronic audio device and transmitted substantially simultaneously to the second user via the speaker of the second electronic audio device; the second electronic audio device is configured to transmit the audio back to the user of the first electronic audio device, wherein the audio going from an audio owner to another party cannot be tapped into by any other party without authorization from the audio owner; said second user audio provided to the first user to perform at least one of the following operations:

repeating, translating, commenting over, the received audio by the first user of the first electronic audio device from the far end party so that the first user may selectively receive two audio signals simultaneously; whereas the far end user only receives audio from the first user.

2. The system according to claim 1, wherein the audio owner is the first user and a far end party's conversation with the first user is only selectively hearable by the second party and the first user, so that transmitted audio may be private as to the far end party.

3. The system according to claim 1, wherein the audio initiated by a user or far end party going to any user or party cannot be tapped into by any other user or party without authorization from the audio's owner.

4. The system according to claim 1, comprising an electronic content device associated with the first electronic audio device and/or the second electronic audio device, and wherein the electronic content device includes a controller configured for controlling the audio transmitted from the first electronic audio device to the second electronic audio device.

5. The system according to claim 1, wherein audio from the second user to the first user is selectively converted to text and displayed on an electronic content device visible to the first user.

6. The system according to claim 5, wherein the audio is electronically taken from a phone conversation with a far-end caller transmitted to the speaker of the first electronic device.

7. The system according to claim 1, wherein the system is configured for delaying the transmitting audio from the first electronic audio device to the second electronic audio device.

8. The system according to claim 1, wherein the system is configured for storing the transmitted audio from the first electronic audio device to the second electronic audio device, by storing remotely in a cloud service storage.

9. A method for performing hearing assist audio communication between a first user of at least a first electronic audio device and a second user of a second electronic audio device, where the electronic audio devices include a speaker and a microphone, said first electronic audio device also capable of being electronically connected with a far end party to engage in a conversation between the first user and the far end party;

wherein audio generated by a party is considered the audio's owner and is controllable by said owner with respect to which other party may hear it;

the method comprises:

configuring the first and second electronic audio devices for wireless communication therebetween via a wireless connection, configuring the first and second electronic audio devices to transmit and/or receive audio directly between each other via the wireless connection;

the first electronic audio device is configured to operate in a mode wherein audio is picked up by the microphone of the first electronic audio device and transmitted substantially simultaneously to the speaker of the second electronic audio device; wherein the second audio device is configured to transmit the audio back to the user of the first electronic audio device, wherein the audio going to from an audio owner to another party so that another party cannot tap into the audio owner's conversation with a party without authorization of the audio owner;

the audio received by the first user of the first electronic audio device from the far end party therefore including two signals simultaneously; audio transmitted to the first user from the second user is directed only to the first user;

whereby the second user may repeat, translate or comment on audio from the far end party, while the far end party cannot hear audio from the second user.

10. The method of claim 9, wherein the far end party conversation with the first party is also hearable by the first and second users but conversation between the first and second user cannot be heard by the far end party.

11. The method of claim 9 wherein audio transmitted from the first to second user may be deliberately delayed.

12. The method of claim 9 wherein said second user may receive a ping warning from the first user indicating that audio is ready to be transmitted to the second user.

* * * * *